DEMULTIPLEXER FOR CARRIER WAVE (E.G., FM STEREO SIGNAL) WHOSE AMPLITUDE AT FIXED INTERVALS IS INFORMATION-REPRESENTATIVE

Filed July 16, 1963 2 Sheets-Sheet 1

BLOCK DIAGRAM OF DEMULTIPLEXER

INVENTOR.
BRUCE G. CRAMER
BY
Robert D. Sanborn
ATTORNEY

WAVEFORMS PRESENT IN FIG. 1. SYSTEM

INVENTOR.
BRUCE G. CRAMER
BY Robert D. Sanborn
ATTORNEY

United States Patent Office 3,268,663

Patented August 23, 1966

3,268,663

DEMULTIPLEXER FOR CARRIER WAVE (E.G., FM STEREO SIGNAL) WHOSE AMPLITUDE AT FIXED INTERVALS IS INFORMATION-REPRESENTATIVE

Bruce G. Cramer, Ambler, Pa., assignor to Philco Corporation, Philadelphia, Pa., a corporation of Delaware Filed July 16, 1963, Ser. No. 295,363

5 Claims. (Cl. 179—15)

This invention relates to stereophonic broadcast receivers, and, in particular, to a new and improved system for demultiplexing a composite FM stereophonic signal.

PRIOR ART

Present FCC regulations permit FM radio stations to broadcast stereophonic program material by multiplexing two signals, hereinafter designated "left" and "right," on a single carrier wave. In accordance with the approved system, the composite signal which frequency modulates a carrier is formed of: (1) the sum of the left and right signals $(L+R)$, (2) the upper and lower sidebands only of a 38 kc. subcarrier amplitude modulated by the difference of the left and right signals $(L-R)$, the subcarrier itself being suppressed, and (3) a 19 kc. pilot tone. This system is compatible with monophonic receivers since only the $(L+R)$ signal produces an audible signal at the output of the monophonic receiver. The $(L+R)$ signal corresponds to the signal normally broadcast by a monophonic transmitter. The 19 kc. pilot tone, which is used for detection purposes in the stereophonic receiver, and the $(L-R)$ amplitude modulated, 38 kc. suppressed subcarrier signal are superaudible and do not interfere with monophonic reception.

The composite signal has been heretofore demultiplexed in the stereophonic receiver in accordance with one of two systems. In the first or matrixing method the $(L+R)$ signal is separated from the remainder of the signal by means of a low-pass audio filter. The 19 kc. pilot tone is separated with a 19 kc. narrow bandpass filter, and then doubled to yield a 38 kc. reference signal. The amplitude-modulated, 38 kc. suppressed carrier signal is separated from the 19 kc. pilot tone and the sum signal $(L+R)$ with a bandpass filter and the 38 kc. reference signal is combined therewith to yield a 38 kc. amplitude modulated signal which is then envelope detected to yield the $(L-R)$ signal. The $(L+R)$ and the $(L-R)$ signals are then added to yield 2L or the left audio signal and subtracted to yield 2R or the right audio signal.

This first method of demultiplexing is known as the matrixing method because of the addition and subtraction involved. It has several disadvantages which include the need for a delaying compensator, several frequency selective filters, a frequency doubler, as well as certain audio phasing problems.

The second method of demultiplexing is known as the time division method. It was discovered that the amplitude of the composite signal is represented by the amplitude of uniformly spaced samples of the left and right audio signals, respectively, during the middle of opposite half cycle intervals of the 38 kc. subcarrier. The time division method takes advantage of this feature and operates as follows. The 19 kc. pilot tone is first doubled and amplified to yield a 38 kc. gating wave. This wave is then used to alternately switch the composite signal to left and right channels during opposite half cycles of the gating wave. Each channel is then low pass filtered to yield the left and right audio signals.

The time division method is disadvantageous in requiring a doubler as well as critical phasing of the 38 kc. gating wave. In addition, high channel separation is unobtainable in the pure gating system, although the addition of matrixing or other techniques can improve separation.

OBJECTS

Accordingly several objects of the present invention are:

(1) To provide a new and improved demultiplexer for use with FM stereo multiplexed signals;

(2) To provide an FM stereo demultiplexer of increased simplicity and reliability; and (3) To provide an FM stereo demultiplexer having improved channel separation.

Other objects and advantages of the invention will become apparent from a consideration of the ensuing description.

SUMMARY

In accordance with the present invention the detected composite signal obtained, for example, from a discriminator, is added in separate circuits to two amplified versions of the 19 kc. pilot tone, one whose phase is advanced 45° and one whose phase is retarded 45° from reference phase. Each additively-formed signal is limited and low-pass filtered to provide signals corresponding to the original left and right audio signals, respectively.

DRAWINGS

FIG. 1

Figure 1:
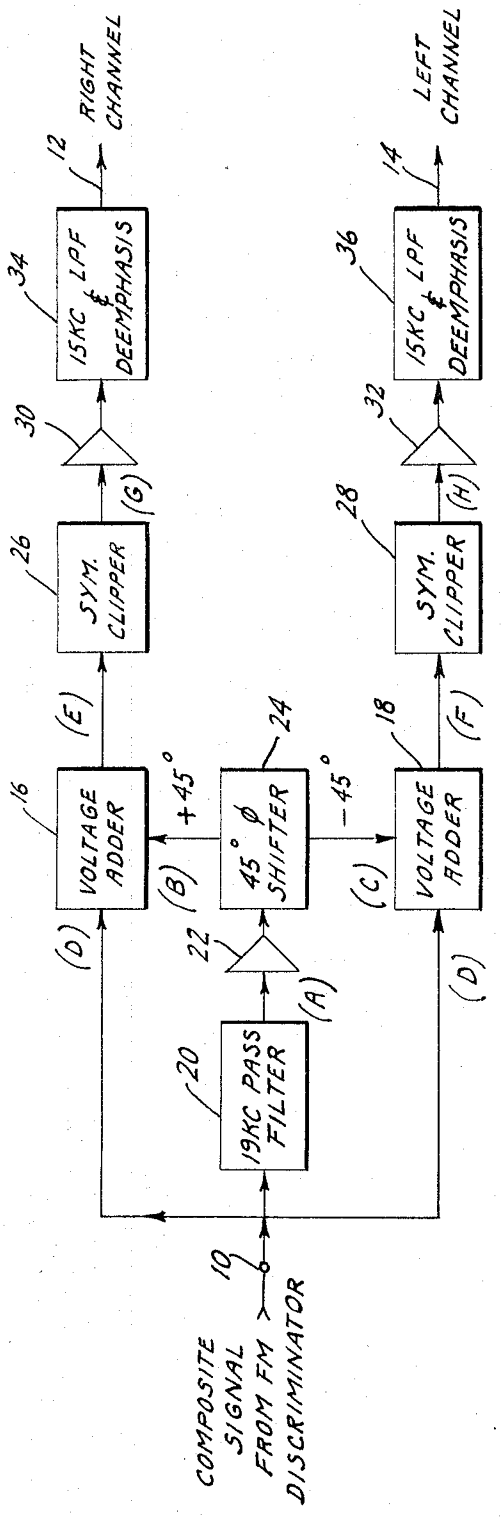
FIG. 1 shows, in block diagram form, one preferred embodiment of the invention.

In the demultiplexer of FIG. 1 the composite signal from the discriminator of the FM tuner is applied to input terminal 10. The right and left audio outputs are obtained at output terminals 12 and 14 respectively. (An SCA (Subsidiary Communications Authorization) filter (not shown) would also be included between the discriminator and the demultiplexer in an FM stereo receiver to block interference from background music or other private subscription communications from the receiver.)

The demodulated composite signal applied to point 10 is fed in parallel to voltage adders 16 and 18 and 19 kc. narrow band filter 20. Filter 20 is designed to pass only the 19 kc. pilot tone present in the composite signal. The output of filter 20 is coupled to amplifier 22 which is designed to provide about 40 db of gain. It will be obvious that the separate functions of filter 20 and amplifier 22 may be combined by using a 19 kc. tuned amplifier, if desired. The amplified 19 kc. pilot tone is applied to 45° phase shifter 24 which has two outputs. The signal at one output has a phase which leads the signal supplied by amplifier 22 by 45°. The signal at the other output has a phase which lags the signal supplied by amplifier 22 by 45 degrees.

Adder 16 adds the composite signal to the 19 kc. pilot tone with the 45° leading phase while adder 18 adds the composite signal to the amplified 19 kc. pilot tone with the 45° lagging phase.

The outputs of the adders 16 and 18 are coupled respectively to clippers 26 and 28, which function to clip the positive and negative excursions the synthesized signals present at the adder outputs at a level which is a small fraction of the peak amplitude of the signals. Clippers 26 and 28 clip the synthesized signals symmetrically about their zero axes. Broad-band amplifiers 30 and 32 serve to amplify the clipped signals. It will be appreciated that the functions of the clippers and amplifiers may be combined in limiting amplifiers, if desired.

The outputs of the amplifiers 30 and 32 are fed to filters 34 and 36 which are designed to pass substantially only those frequencies below 15 kc. Since standard transmission practice includes preemphasis for the left and right signals, filters 34 and 36 may also be designed to provide deemphasis for the reconstructed left and right signals as in conventional practice. If desired, the functions of the clippers, amplifiers, and filters may be combined in low-pass limiting amplifiers. The outputs of filters 12 and 14 may now be fed to respective earphones, conventional audio amplifiers and loudspeakers, or other audio circuitry (e.g., impedance matching transformers, switches, etc., as desired).

FIG. 2

Figure 2:
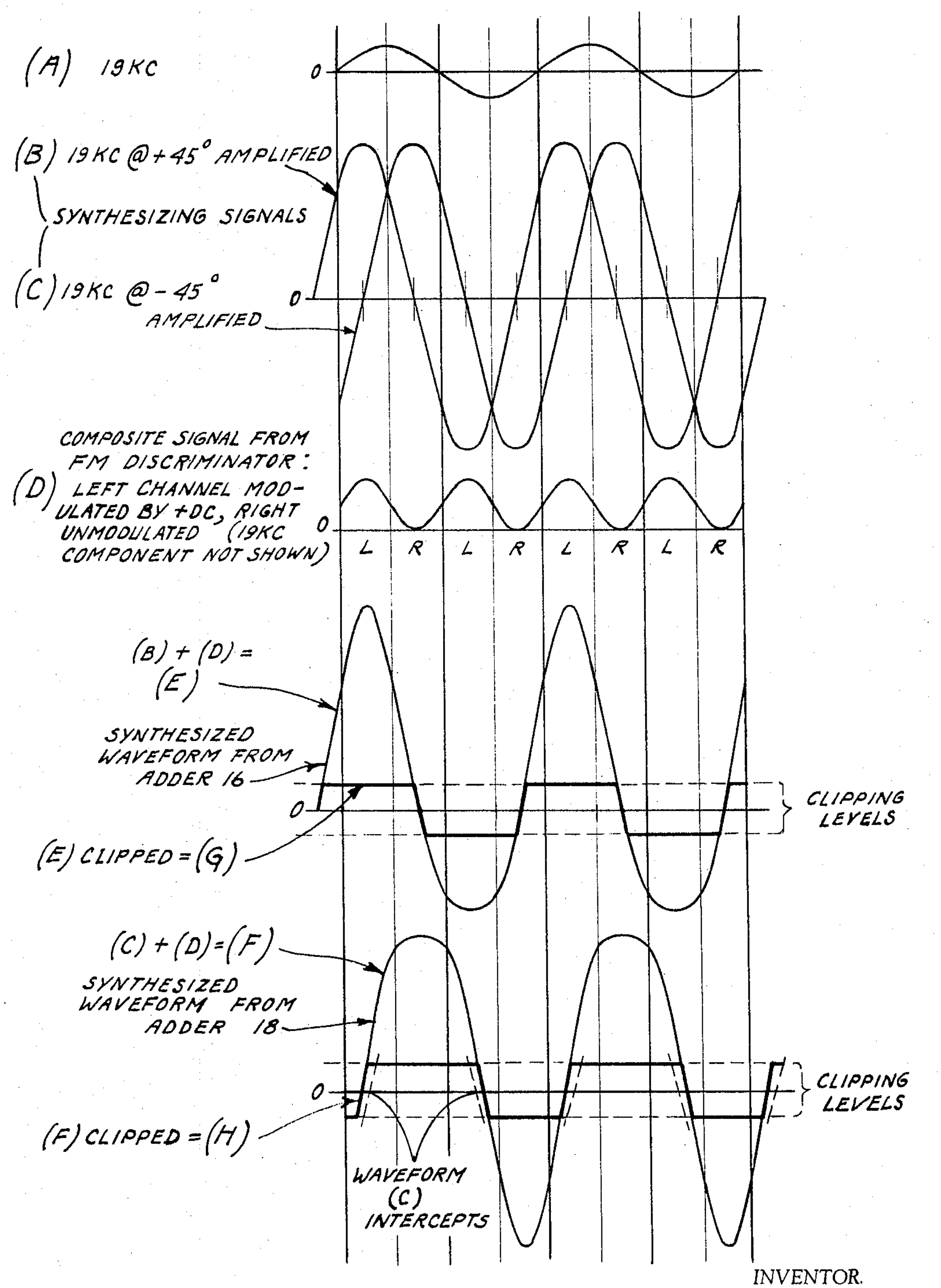
FIG. 2 shows waveforms present in the system of FIG. 1 for an exemplary case.

The waveforms of FIG. 2 are lettered in correspondence with FIG. 1 to indicate the location in the location in the circuit wher each waveform is found.

*Waveform (D)*, the composite signal from the FM discriminator, is shown as containing a particular exemplary modulating signal to be described infra. Although waveform (D) is applied to point 10 at the input of the demultiplexer it is not shown as the first waveform in FIG. 2 but is placed near other waves with which it is closely related in order to facilitate a comprehension of the subsequent explanation of the circuit's operation. Also waveform (D) has been shown without the 19 kc. pilot tone component of the composite wave for purposes of simplification. The omission of said component does not affect the ensuing explanation. At any rate the 19 kc. pilot tone component is later removed in the final stage of the demultiplexer as will be explained. If the 19 kc. pilot tone were present in waveform (D) it would alter the appearance of the waveform (D) by producing a small 19 kc. ripple thereon.

*Waveform (A)* is the 19 kc. pilot tone filtered from waveform (D).

*Waveforms (B) and (C)*, which are shown superimposed on the same time axis, are the respective 45° advanced and 45° retarded versions of an amplified version of waveform (A).

*Waveform (E)*, is a sythesized waveform produced by addition of waveforms (B) and (D).

*Waveform (G)*, superimposed on waveform (E), is a version of waveform (E) as symmetrically clipped about its zero axis.

*Waveform (F)* is a synthesized wave produced by addition of waveforms (C) and (D), and *waveform (H)* is the symmetrically clipped version about the zero axis of waveform (F).

The heavy vertical lines in FIG. 2 define separate cycles of the 38 kc. subcarrier while the light vertical lines define the 180° points of the subcarrier. The 38 kc. subcarrier, which is not shown in FIG. 2, is similar to waveform (D) which has a frequency of 38 kc. However the phase position and D.C. level of waveform (D) are different than the subcarrier's due to the modulation present in waveform (D), as will be explained.

OPERATION

It will be recalled that a characteristic of the FCC-approved multiplex system is that the amplitude of the composite wave at the middle of opposite half-cycles of the 38 kc. subcarrier is equal to the amplitude of uniform samples of the desired left and right signals, respectively. At the middle of the positive half-cycle of the suppressed subcarrier, the amplitude of the composition waveform is equal to the instantaneous amplitude of the original signal in the left channel, while at the middle of the negative half-cycle the signal in the right channel is correspondingly represented. It is this characteristic of the composite waveform that permits it to be demultiplexed with alternate half-cycles of a 38 kc. gating wave according to the time gating method aforediscussed.

This same characteristic is utilized in a different manner in the present invention. The operation of the present invention can be most easily understood by analyzing an exemplary case. Assume that at a conventional FM stereo transmitter, a constant positive voltage is fed into the left channel and zero volts are present in the right channel. In accordance therewith the composite waveform (D) is shown positive at the middle of the first (positive) half-cycle of the 38 kc. subcarrrier, and at zero volts at the middle of the second half-cycle of the subcarrier. The designations "L" and "R" below waveform (D) indicate the half-cycles of the subcarrier when midpoint samples of the composite waveform are representative of the information in the left and right channels, respectively.

RIGHT CHANNEL

The 19 kc. pilot tone is separated from the composite signal waveform (D) by filter 20 and is shown as waveform (A). After amplification in amplifier 22 and a phase shift of +45° in shifter 24 waveform (A) appears as waveform (B). Phase shifter 24 also provides a −45° version of the amplified 19 kc. pilot tone and this is shown as waveform (C) which is on the same time and voltage scale as waveform (B). It should be noted here that during the L intervals the absolute voltage of the −45° waveform (C) crosses the zero line and is temporally symmetrical about the interval's center and hence averages to zero during the interval, while during the R intervals waveform (B) crosses the zero line and is similarly symmetrical and averages to zero. Waveforms (B) and (C) will be termed synthesizing waveforms.

Synthesizing waveform (B) and composite waveform (D) are added voltage-wise in adder 16, yielding synthesized waveform (E). Due to the D.C. level present in waveform (D), synthesized waveform (E) is unsymmetrical about the zero axis; however the locations of the zero intercepts of waveform (E) are the same as the zero intercepts of waveform (B) because waveform (D) has a value of zero volts when the intercepts of waveform (B) occur. The intercepts of waveform (E) occur at the center of the R intervals and hence are uniformly spaced.

In clipper 26 the signal represented by waveform (E) is symmetrically clipped about its zero axis at the levels indicated, yielding waveform (G), which is shown superimposed over waveform (E) in heavy lines. As is well known, severe clipping of a waveform destroys practically all of its characteristics except its zero intercept locations. Waveform (G) thus has the same uniform zero intercepts as waveform (E), and hence is a substantially square wave with equal positive and negative excursions, but without the asymmetry of waveform (E). Since the square wave has equal positive and negative excursions and uniformly spaced zero intercepts, its average value is zero.

Waveform (G) is amplified in amplifier 30 and sent through 15 kc. lowpass filter 34. Since waveform (G) has a fundamental frequency of about 19 kc. and since its average value is zero due to its positive-negative symmetry and its uniform intercepts, filter 34 will completely attenuate the wave and no output will be present at point 12, the right channel output. This is in accordance with the fact that no information had been sent over the right channel.

LEFT CHANNEL

The amplified 19 kc. pilot tone is also retarded by 45° in shifter 24, producing synthesizing waveform (C), which is added to composite waveform (D) in adder 18. The zero intercepts of waveform (C) occur at the center of the L intervals, which is when waveform (D) is equal to the left channel information. Since waveform (D) is positive during the center portion of the L intervals (due to the constant positive voltage supplied to the left channel), the zero intercepts of synthesized waveform (F) will be different from those of waveform (C).

As indicated by the dashed lines adjacent the intercepts of waveform (F), at those times when waveform (C) crosses the zero axis with positive slope, the corresponding intercepts of waveform (F) will be advanced, while when waveform (E) cross the zero axis with negative slope the corresponding intercepts of waveform (F) will be retarded. The resultant intercepts of waveform (F) are no longer uniform; those intercepts bounding the positive excursions of waveform (F) are further apart than those bounding the negative excursions thereof.

Symmetrical clipping of waveform (F) in clipper 28 at the levels indicated yields waveform (H), which is shown superimposed over waveform (F) in heavy lines. The areas under the positive excursions of waveform (H) are obviously greater than the areas under the negative excursions. Thus waveform (H) has a positive D.C. component.

Waveform (H) is amplified in amplifier 32 and its component frequencies above 15 kc. are removed in filter 36. The resultant output signal at terminal 14 will be the positive D.C. component of waveform (H) only, which corresponds to the D.C. signal originally supplied to the left channel.

It will be apparent that if the L interval peaks of waveform (D) are higher than shown, indicating a higher direct voltage on the left channel, the resultant intercepts of waveforms (F) or (H) will be even more unsymmetrical than as shown, and, consequently, the resultant D.C. output signal from filter 36 will be of greater amplitude. Thus it is seen that the demultiplexer of the invention will proportionately reproduce the amplitude of the modulating wave.

If a changing audio voltage having a frequency of less than 15 kc. is present in the left channel, the amplitude of waveform (D) at the center of the L intervals will have corresponding changes as will the intercepts of waveforms (F) or (H). Consequently the changing audio voltage will be faithfully reproduced at point 14.

It will be apparent now that any audio information supplied to either the left or right channels will be demultiplexed. If different audio signals are supplied to both channels simultaneously, as in normal FM stereo broadcasting, they will be demultiplexed simultaneously according to the foregoing principles. It can be shown that there will be little if any cross talk between the two output signals.

The 15 kc. lowpass filters 34 and 36 will eliminate the large 19 kc. component and the smaller higher frequency components present in the composite signal and hence in the square waves due to limiting. Filters 34 and 36 are also designed to deemphasize their respective signals since a deemphasis network may easily be incorporated as part of a low-pass filter.

The invention is not limited to the specific stereo multiplex application aforediscussed, but is applicable to any multiplexed carrier wave whose amplitude at fixed intervals is representative of samples taken of one or more information signals. (One such signal may be the chrominance subcarrier in a color TV receiver.) Said information signals may be demultiplexed individually or simultaneously by adding to the multiplexed waveform one or more greater amplitude signals whose phase and frequency are such that their positive and negative going zero intercepts occur at those times when the amplitude of the multiplexed signal is representative of uniformly spaced samples of the particular information waveforms to be separated.

The phase of the signal which is added to the multiplexed waveform is not acutely critical since demultiplexing without substantial error will still occur with minor deviations from optimum. This is one of the advantages of the present "limiting" demultiplexer over prior time gating demultiplexers since the phase of the gating wave in the latter is somewhat critical.

Other advantages of the present demultiplexer are its simplicity, resulting low cost, elimination of a doubler, switching circuits, and numerous filters. As the amplitude of the 19 kc. phase shifted signals (B) and (C) are increased, any distortion present in the outputs due to the demodulation process will decrease. However, when the 19 kc. signals are increased, the amplitude of the audio outputs will decrease and additional audio gain will be required.

The instant invention is not limited to the specificities of the foregoing description since many modifications thereof which still fall within the true scope of the inventive concept will be apparent to those conversant with the art. The invention is defined only by the appended claims.

I claim:

1. A system for demultiplexing a carrier wave whose amplitude at fixed intervals is information-representative, comprising:

(a) a source of a signal whose phase and frequency are such that its zero intercepts temporally coincide with the information-representative points of said carrier, (b) means for additively combining said carrier and said signal to form a synthesized waveform, (c) means for symmetrical clipping said synthesized waveform about its zero axis, and (d) means for substantially removing the signal and higher frequency components from the clipped synthesized waveform.

2. A system for demultiplexing a carrier wave whose amplitudes at a first set of uniformly spaced points are representative of the amplitudes of uniformly spaced samples of a first information signal and whose amplitudes at a second set of uniformly spaced points are representative of the amplitudes of uniformly spaced samples of a second information signal, comprising:

(a) means for supplying a first synthesizing signal whose phase and amplitude are such that its zero intercepts occur simultaneously with said first set of points, (b) means for supplying a second synthesizing signal whose phase and amplitude are such that its zero intercepts occur simultaneously with said second set of points, (c) means for additively combining said first and second synthesizing signals with said carrier to form two synthesized signals, (d) means for symmetrically clipping each of said synthesized signals about its zero axis, and (e) means for lowpass filtering each of the clipped synthesized signals to remove therefrom the synthesizing signal and higher frequency components.

3. The system of claim 2 wherein a discriminator arranged to detect the composite signal in the FCC-approved FM stereo multiplex system is provided for supplying said composite signal, and said synthesizing signals are amplified respectively 45° phase-advanced and retarded versions of the 19 kc. pilot tone present in the FCC–approved FM stereo multiplex system.

4. In combination:

(a) a source of a composite signal representative of the signal formed by adding:
    (1) the sum of left and right stereophonic signals,
    (2) a signal of a given frequency amplitude-modulated by the difference of left and right stereophonic signals, and
    (3) a pilot tone of half said given frequency;

(*b*) means for separating the pilot tone component from said composite signal, (c) means for shifting the phase of said pilot tone by 45°, (d) means for shifting the phase of said pilot tone by —45°, (e) means for adding the +45° shifted version of said pilot tone to said composite signal to produce a first synthesized signal, (f) means for adding the —45° shifted version of said pilot tone to said composite signal to produce a second synthesized signal, (g) means for symmetrically clippping said first synthesized signal about its zero axis, (h) means for symmetrically clipping said second synthesized signal about its zero axis, (i) means for filtering all frequency components equal to the frequency of said pilot tone and higher from the clipped version of said first synthesized signal to reproduce said right stereophonic signal, and (j) means for filtering all frequency components equal to the frequency of said pilot tone and higher from said second synthesized signal to reproduce said left stereophonic signal.

5. The combination of claim 4 where said given frequency is 38 kilocycles and said pilot tone is amplified before being added to said composite signal.

References Cited by the Examiner

UNITED STATES PATENTS

| | | | |
|---|---|---|---|
| 2,980,762 | 4/1961 | Sonnenfeldt | 178—5.4 |
| 3,114,004 | 12/1963 | Schroeder | 179—15 |
| 3,233,044 | 2/1966 | Hopper | 179—15 |

DAVID G. REDINBAUGH, *Primary Examiner.*

R. L. GRIFFIN, *Assistant Examiner.*